Figure 1:
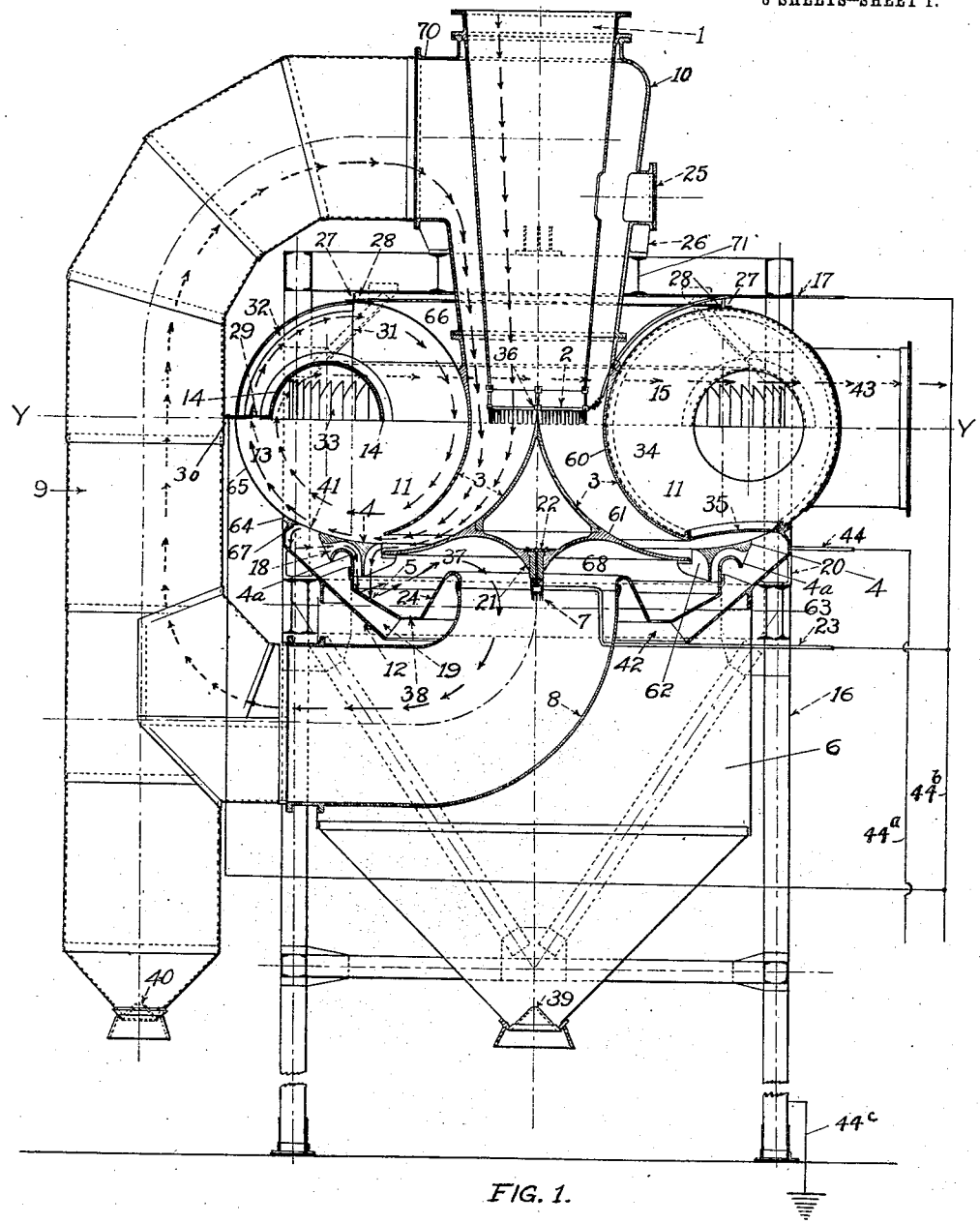

M. W. JOHNSON, Jr.
DRY CLEANER FOR GAS.
APPLICATION FILED JULY 26, 1909.

1,024,784.

Patented Apr. 30, 1912.

3 SHEETS—SHEET 1.

WITNESSES:

INVENTOR
MARK W. JOHNSON Jr.
BY
ATTORNEY

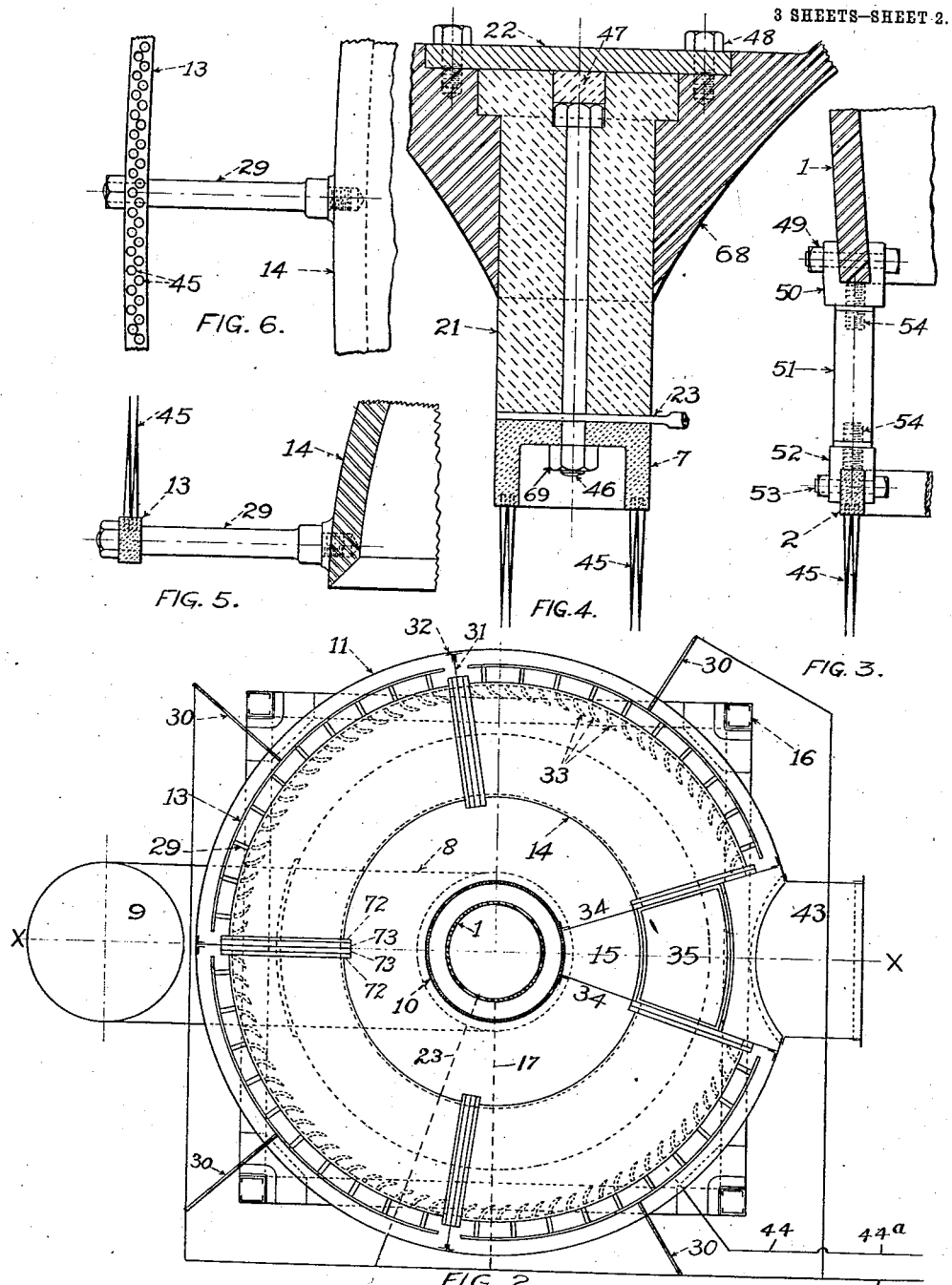

M. W. JOHNSON, Jr.
DRY CLEANER FOR GAS.
APPLICATION FILED JULY 26, 1909.

1,024,784.

Patented Apr. 30, 1912.

3 SHEETS—SHEET 3.

WITNESSES:

INVENTOR
MARK W. JOHNSON, Jr.
BY
ATTORNEY

UNITED STATES PATENT OFFICE.

MARK W. JOHNSON, JR., OF BIRMINGHAM, ALABAMA.

DRY CLEANER FOR GAS.

1,024,784.  Specification of Letters Patent.  Patented Apr. 30, 1912.

Application filed July 26, 1909. Serial No. 509,511.

*To all whom it may concern:*

Be it known that I, MARK W. JOHNSON, Jr., a citizen of the United States, residing at Birmingham, in the county of Jefferson and State of Alabama, have invented new and useful Improvements in Dry Cleaners for Gas, of which the following is a specification.

My invention relates to an apparatus for cleaning gas or other fluids and operates upon the principle that, if a body of fluid be given a vortex or spiral movement around an axis in a closed vessel, the dust and other impurities will tend, under the influence of centrifugal force, to move to the periphery of the whirling body. If then means be provided to deflect or skim from the vessel the outer stratum of the moving fluid, the dust, which is centrifugally concentrated there, will be driven off from the body of fluid under treatment in the vessel. To make the operation continuous, uncleaned fluid is introduced at or near the outer periphery of the circulating body of fluid in the cleaning chamber, and the cleaned fluid is drawn off from the inner periphery of the said body. When operating as a gas washer, as the gas to be cleaned enters the chamber, it flows around an axis in a spiral or preferably in a vortex wherein it gradually approaches its axis until it is diverted toward its discharge port. As the gas moves thus, each complete convolution or stratum may be considered as a separate stage in the continuous process of cleaning and the equivalent of the treatments in successive cleaners according to present practice, for each succeeding stratum, approaching the discharge, carries less dust than the next preceding stratum, and is continuously subjected, while in the chamber, to the cleaning effect of the centrifugal force tending to expel the dust through the skimmer. Hence, any dust that fails to be thrown out during the first stage or lap, is continuously acted upon by centrifugal force during its succeeding laps and is positively prevented by that force from reaching the central point of discharge for the purified gas. I provide a dust chamber into which the dirty stratum of gas is deflected from the chamber for cleaning and caused to deposit the dust and impurities therein.

In my preferred construction, I provide two skimming means to catch the dust, the first deflecting the dirty stratum of the gas flowing into the centrifugal cleaning chamber, and the second, a like stratum of the gas circulating in the latter chamber, into the dust chamber which has means to produce a circulation of gas to carry back into the cleaning chamber such dust as is not deposited in the dust chamber, whereby I produce a continuous circulation of dust particles past a point of arrest from the cleaning chamber to the dust chamber and back again until the particles of dust finally fall into the dust hopper and disappear from the circulation. To facilitate the ejection by centrifugal force of the dust particles in suspense in the gas, I propose to utilize electrical means to polarize and agglomerate such particles, converting the fine dust into larger bodies which respond readily to the centrifugal force and gravity tending to drive them off.

More particularly, but without being limited thereto, I propose to adapt my invention to a dry cleaner for waste gases of blast furnaces, and as my preferred construction, to use a vortex-ring-chamber with a central annular jet for delivering the gas to be cleaned into the vortex chamber which has suspended therein a deflector that diverts the cleaned gas toward a discharge port, and which also has one or more annular skimming orifices opening into a dust chamber. By this arrangement, I can successfully clean gas without bringing it into contact with water or sacrificing any of its heat units. In this preferred type of apparatus the particles of gas are caused to move in a vortex-ring in which the relative movement of the particles corresponds to the movement of the particles in smoke rings, which at times are ejected by the exhaust from engines.

My invention further comprises the details of construction and arrangements of parts hereinafter more fully described and claimed and illustrated in the accompanying drawings, in which:—

Figure 7:
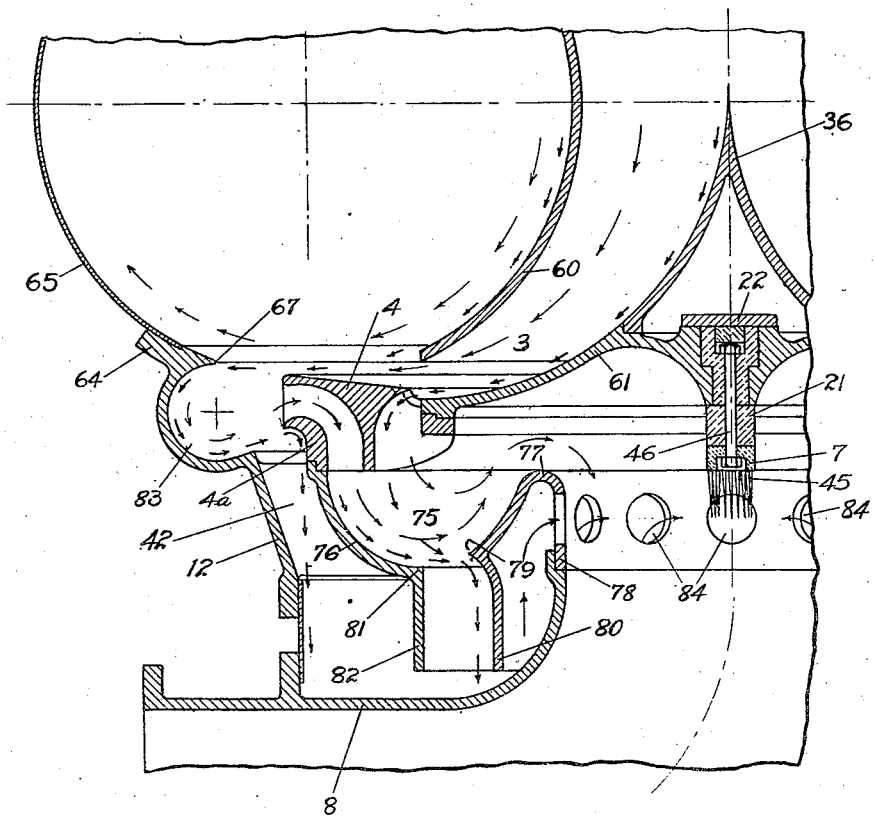

Figure 1, is a vertical cross-section through the center of the apparatus, taken along the line $x$—$x$ of Fig. 2. Fig. 2, is a transverse horizontal cross-section taken along the line $y$—$y$ of Fig. 1. Fig. 3, is an enlarged partial sectional view of the main electrode which depends from the inlet nozzle. Fig. 4, is also an enlarged sectional view of the electrode in the gas return flue from the dust chamber. Fig. 5, is a cross-section and Fig. 6 a plan of a portion of the annular electrode disposed in the vortex chamber. Fig. 7, is an enlarged partial sectional view taken on a vertical plane, of a modified arrangement of devices to deflect and deposit the dust in the dust chamber.

Similar reference numerals refer to similar parts throughout the drawings.

Gas flows into my cleaner through a nozzle 1, preferably formed as a single casting flanged at the top to join to the gas main leading from the dust catcher or other point of supply for the gas to be cleaned. The nozzle tapers inwardly toward its bottom in order to increase the speed of flow of the gas, which can be done without back pressure provided the nozzle area is increased again to restore the original speed. At the lower end of the nozzle I attach an electrode 2, consisting of a circular copper bar carrying numerous fine points 45 pointing downward. The bar is supported by insulators 51, each of which, at its upper end, connects to a clip 50 fastened by a bolt 49 to the nozzle 1, and at its lower end connects to a similar clip 52, fastened by bolt 53 to the bar. The insulator 51 is preferably connected to the clips by screws 54. Electrical current is delivered to the ring by an armored conductor 17. The gas, as it flows from the nozzle 1, enters an annular nozzle or spreader 3, which comprises an upper portion 10 that merges into or is suitably connected to an annular section 60 of the vortex-ring-chamber 11, which section 60 is a ring, concave in vertical cross-section and disposed over the conical circular bottom piece of the spreader. This bottom piece tapers gradually from its apex 36 along symmetrical curves which merge into the base ring section 61, which is slightly concaved in vertical cross-section and, with section 60, forms the annular nozzle 3. The gas entering through the nozzle 1 is opened up by the apex 36 and gradually spread out as it follows down the section 61 until discharged in a thin annular jet tangentially into the vortex-ring-chamber. The whole bottom piece may be cast integral, if desired, and it is supported at its periphery by a number of ribs 62 on the dividing ring 4. The walls of the nozzle 3 converge toward the discharge in order to maintain the cross-sectional area of the nozzle substantially uniform.

The dividing ring 4 comprises two annular portions 4 and 4ª, held together by ribs 18 that extend across the annular port formed between said portions. The inner edge of the ring 4 is tapered to a fine cutting edge which stands in front of the annular discharge orifice of the nozzle 3 and is positioned above the nozzle wall 61 so that it will cut the gas jet, skimming off and deflecting the bottom stratum of gas, in which the dust is concentrated by centrifugal force and gravity, into a dust chamber 6. This chamber is hoppered at the bottom and normally closed by a bell 39, and at its upper end is bolted to a flange depending from the under face of a deflector ring 12 having feet 20 cast thereon and adapted to rest upon the cross beams 63 of the structural frame. Also this ring is flanged at 64 and riveted to the outer curved section 65 of the vortex-ring-chamber. This section 65 is itself flanged and bolted to the lower end of nozzle 10. The ring 4 and the sections 60, 65 and 66 form an annular vortex-ring-chamber, circular in vertical cross-section and continuous but for the annular cleaning opening 41 left between the ring 4 and the sharpened edge 67 formed at the upper end of the deflector 12. The deflector 12 is termed the outer deflector and is disposed in the dust chamber 6 and has ribs 19 which support above it an upper deflector 5, which is suitably riveted to the ring 4. The plate 61 has a central depending conical portion 68 having an opening to receive a block of insulation 21, which is flanged at its top and held in place by a top plate 22 and cap screws 48. A bolt 46 is embedded in or passed through a central opening in the body of insulation, a plug of insulation, 47, being interposed between the plate 22 and the bolt, the lower end of which passes through a conductor 23 and electrode 7. A nut 69 on the end of the bolt holds the electrode in place. The electrode comprises a ring 7 and a cluster of hanging points 45 and overhangs the inlet end of the circulation elbow 8, which is riveted into the wall of the dust chamber and supported thereby. A flaring hood 24 rests in a flange ring formed at the top of the pipe 8. The hood slopes downwardly to the plane of the deflector 5, a ring port 38 being left between these parts.

The circulation elbow 8 joins the circulation pipe 9 which is attached above to the entrance flange 70 of a port entering the circulation nozzle through the upper portion 10 thereof. This portion 10 is provided with a man hole closed by a cover 25 and has feet 26 which rest upon the I-beams 71 of the superstructure. The pipe 9 extends below its point of juncture with the elbow 8 and has a bottom opening normally closed by a bell 40. Sections 65 and 66 of the vortex-ring-chamber, at their point of juncture, are each respectively riveted to angle irons 27 and 28, which in turn are bolted together, thus providing a removable joint to permit access to the castings below without the necessity of cutting rivets. A third electrode is disposed within the vortex-ring-chamber and comprises a segmental ring of copper 13, formed in four or any other desired number of sections each of which is supported by studs 29 screwed into the discharge ring 14. This ring 14 is semi-circular in vertical cross-section, is disposed concentric with the vortex-ring-chamber with its concave face downward, and is cast in sections with end flanges 72 which are bolted to hanger plates 31, suitable insulation 73 being interposed between the flanges and plate to insulate each section of ring 14 from the other sections and from the hanger plates. These plates are bolted to angle irons 32 riveted to the inner wall of the vortex-ring-chamber. By this means each section of the electrode 13 is insulated and supplied with current by a separate conductor 30 which is suitably insulated from the machine and where exposed to the abrasion of the dust in the circulating body of gases within the vortex-ring chamber is armored. In like manner all other conductors similarly exposed to the gases are armored. The copper bars 13 have numerous fine points 45 which point upward or in the direction of the flow of the gas. Inside the discharge ring 14 are numerous vanes 33, which, on one side of the apparatus incline to the right and on the other side incline to the left, the object of this arrangement being to change the vertical circular motion of the gas as it enters the ring 14 to a horizontal motion through the ring, the gas flowing from a given point in opposite directions toward a discharge chamber 15. This chamber is formed by partitions 34 dividing off a section of the vortex-ring-chamber, and having circular openings to receive and fit the discharge ring 14 which is bolted thereto and insulated therefrom in the same manner as in the case of the plates 31. The bottom of the chamber 15 is closed in by a plate 35 which is bolted on the outside to a suitable flange cast on the deflector ring 12 and on the inside to an opposite flange cast on the ring nozzle section 60. The two streams of gas which are diverted from the center or vortex of the rotating body of gas in the vortex-ring-chamber by the ring 14, converge in the chamber 15 and pass out through the gas main 43 for distribution.

The electric current may be generated in any suitable manner and delivered at the proper voltage for producing a brush discharge from the several electrodes in the apparatus to the terminal wires 44ª and 44ᵇ. The terminal 44ª is shown connected to the conductor 44, while the terminal 44ᵇ is connected to the several conductors 30 and also to the conductors 17 and 23, which two latter conductors are indicated in dotted lines in Fig. 2. The circuit connections are formally illustrated in Figs. 1 and 2. The machine is grounded by a wire 44ᶜ to prevent the accumulation of a static charge by induction. The supporting frame 16 for the apparatus is of ordinary structural steel work built of beams, channels, etc., and the columns are to be bolted to a suitable foundation.

The operation of the cleaner is as follows:—Upon entering the entrance nozzle, the gas first has its velocity increased as much as possible without creating additional back pressure, and then passing the first electrode 2, the particles of dust become polarized by induction and agglomerated by electrical attraction, and are thrown down by centrifugal force and gravity against the lower curved flaring surface 61 of the ring nozzle 3 over which the gas is opened up by the sharp point 36 and spread out in a thin layer, reducing as much as possible the distance to be traveled by any particle farthest away from the collecting surface. Part of the gas is then caught under the knife edge of the dividing ring 4 and is turned downward striking the first deflector ring 5. The angle of slope of this ring is such that the gas is deflected from it in such a direction as will aid it to enter freely into the ring port 37 through which it passes and is turned down converging centrally under the inverted flare formed by the wall 68 and enters the circulation elbow 8. The practically static body of gas in the dust chamber will have in a sense a back pressure effect upon the stratum of gas deflected by the knife-edge against the ring 5, which back pressure will have a tendency to increase the deflection of the lighter or cleaner gas of said stratum toward and through the ring port 37. The cinders and dust in said stratum will, however, pass along the plate 5 into the dust chamber, while the dirtier gas will tend to form eddy currents which pass off through the port 37. As the gas strikes the first deflector ring 5, the dust which is separated from it enters through the ring port 38 into the dust chamber 6 where it settles down and remains undisturbed until drawn off through the bell outlet 39. As the gas enters the circulation elbow, it passes the second electrode 7 where any remaining dust is again polarized and agglomerated as before, and is thrown down by centrifugal force and gravity against the bottom of the circulation elbow, and is caught in the lower end of the circulation pipe 9 where it settles down to be drawn off through the bell outlet 40. Passing upward through the circulation pipe the gas enters the circulation nozzle 10 and is turned downward passing again the first electrode 2, and the dust particles thus thrown out enter the dust chamber along with the first dust coming in from the entrance nozzle, as above described. The gas passes through the ring nozzle as before, but now moves in an upper stratum which passes above the knife edge of the ring 4 and enters the vortex-ring-chamber 11 within which it begins to circulate rapidly in the form of a vortex spiral. In each revolution it passes the third electrode 13, where any particles of dust still remaining are polarized and agglomerated and thrown by centrifugal force and gravity against the outer shell of the vortex-ring, where they are swept around until they reach the second ring port 41 into which they are deflected by the edge 67 and through which they enter and are swept along down the surface of the second deflector ring 12 until they reach the dust chamber 6 through the ring port 42. The gas that naturally will pass out with the dust particles strikes the second deflector ring 12 which is inclined at such an angle as will aid it to enter the ring port between 4 and 4$^a$ through which it joins the gas coming down from beneath the dividing ring 4 and passes on into the circulation elbow, thus returning through the circulation pipe and nozzle to the vortex-ring-chamber. The static body of gases in the dust chamber in this instance opposes the tendency of the deflected stratum of gas to pass around the plate 12 into the dust chamber as, in effect, it offers a resistance which will cause the gas, in seeking the course of least resistance, to pass through the port 18. This action is also aided in a sense by the suction effect of the inner stratum of gases passing the discharge port of said passage.

The outer annular area between the vortex-ring and the discharge ring 14 is equal to the inner annular area between the same, and is about nine times that of the entrance nozzle, though it may be more or less than this as occasion may require. In the construction shown the gas will be made to whirl around in the vortex-ring-chamber about nine times, each time passing the electrode 13 and approaching nearer to the discharge ring 14 during each revolution. Finally entering the same it is turned aside by the vanes 33 into a horizontal circular direction or motion, and passes on through the discharge ring into the discharge chamber 15, and then through the flanged outlet nozzle 43 into the gas main, now free from dust and yet retaining its initial heat, no cooling sprays, etc., of water or steam being used in any part of the apparatus. The discharge chamber 15 and the nozzle 43 can be placed on any side of the cleaner that may be desired for convenience in making pipe connections. The polarized particles of dust, both conducting and non-conducting, have an electric attractive force for each other and for all the surfaces opposite them except the discharge ring, which, being insulated and electrically charged, repels the dust. As soon as the dust reaches a negative surface its electric charge is at once dissipated and its attraction lost, therefore it will not have a tendency to adhere to the surfaces but is free to be swept along by the blowing gas toward the nearest dust outlet which it will be absolutely free to enter.

In Fig. 7 I illustrate an arrangement of deflectors and knife edges in the dust chamber which most effectively separate the dust from the gas. Here, the dividing ring 4 deflects a dirty stratum of gas into the annular chamber 75 which has curved walls formed by the upper deflector 76 and the hood 77. This hood has a flange 78 which is set in a groove in the entrance end of pipe 8 and has a deflecting knife edge 79 below which is an annular depending deflector ring 80 which extends well down into the dust chamber. The deflector 76 has its curved portion terminating abruptly at the knife edge 81 below which depends a deflector 82 similar to 80. The edge 81 stands below the edge 79. The outer deflector 12 is formed with a curved ring groove 83 which receives the gas and dust skimmed off by the edge 67 and shoots them against the deflecting edge of the ring portion 4$^a$, which throws the dust and dirtier gas down through passage 42 while the lighter or clean gas passes between 4 and 4$^a$ into chamber 75. Here the two streams of gas flowing into chamber 75 are deflected around the curved face 76 and directed against the edge 79 which again divides the dust and dirtier gas downwardly between the deflectors 80 and 81 into the dust chamber, while the cleaner gas passes into the pipe 8. To provide for the circulation necessary to insure the deflection of the dust into the dust chamber, I provide a series of ports 84 in the flange 78 which are so protected by the deflector 80 that but little current will result such as might tend to pick up and carry off the lighter dust that has settled in the dust chamber. The principal advantage gained by this construction is the additional centrifugal concentration of dust by the rapid rotary movement of the gas along the surfaces 83 and 76 and the additional dividing of the lighter from the heavier, dirtier gas in which the dust is concentrated, by the edges 4$^a$ and 79, the apparatus otherwise functioning as hereinbefore described. When I refer to a circular or vortex ring-chamber I mean a chamber in the form of an annulus, the cross sections of which, as cut by radial planes perpendicular to the plane of the annulus, are circles or substantially round. But when I refer to a circular chamber I refer to one having cross sections as above but which need not be an annulus and in which the gas whirls about an axis which may be a straight or curved line as contrasted with a circle in a vortex ring-chamber.

Having thus described my invention, what I claim as new and desire to secure by Letters Patent is:—

1. In an apparatus for the cleaning of gas by combined electric and centrifugal means, a cleaning chamber having deflecting surfaces causing the gas discharged thereinto to flow with a vortex movement about an axis, electrical means to agglomerate the dust in the gas to facilitate its centrifugal concentration at or near said surfaces, deflecting means at one or more points in said surfaces to divert an outer stratum or strata of the flowing gas from the whirling body of gas, and means to draw off the clean gas from or near the axis of the vortex.

2. In an apparatus for cleaning gas comprising a chamber in which the gas is caused to whirl about a central axis with a vortex movement, means to deliver the uncleaned gas tangentially into the whirling body of gas, means to draw off the cleaned gas from the center of the whirling mass, deflecting means acting on the outer portion of the whirling body of gas to deflect a stratum therefrom in which the dust particles are centrifugally concentrated, a receptacle, means acting upon said deflected stratum of gas to cause the deposit in said receptacle of more or less of the dust therein, and means to return said deflected stratum of gas from said receptacle to the whirling mass of gas in the cleaner at a point where it will be caused to again flow past said deflecting means, as and for the purposes described.

3. In an apparatus of the character described, a cleaning chamber, means to deliver thereinto a stream of fluid in a direction which will cause same to whirl therein about an axis, means to skim off the outer stratum of the fluid, a receptacle into which skimmed fluid flows and deposits foreign matter in suspension therein, means to return the fluid from said receptacle to said cleaning chamber, and means to draw off the cleaned fluid from the center of the whirling mass, substantially as described.

4. In an apparatus of the character described, a cleaning chamber, means to deliver thereinto a stream of fluid in a direction which will cause same to whirl therein about an axis, a deflector consisting of a continuous knife-edge disposed transversely to the flowing fluid which acts to skim off the outer stratum of the fluid, means to draw off the cleaned fluid from said chamber, means acting upon the fluid skimmed off to separate the impurities therefrom, and means to return said latter fluid with the impurities not removed by said treatment, into the cleaning chamber.

5. In an apparatus of the character described, a cleaning chamber having a curved deflecting surface, a nozzle which approaches said chamber at a tangent having a narrow elongated jet orifice disposed so as to deliver a jet of gas in a shallow stream tangentially against said surface which causes the gas to whirl about an axis in said chamber, and a cutting edge to deflect from said flowing gas the impurities therein which become concentrated near said deflecting surface.

6. In an apparatus of the character described, a cleaning chamber having a curved deflecting surface, a nozzle which approaches said chamber at a tangent having a narrow elongated jet orifice disposed so as to deliver a jet of gas in a shallow stream tangentially against said surface which causes the gas to whirl about an axis in said chamber, means to accelerate the speed of flow of the gas through said nozzle, and means to deflect from said flowing gas the impurities therein which become concentrated near said deflecting surface.

7. In an apparatus of the character described, a vortex ring-chamber into which the fluid to be cleaned is discharged tangentially through an inlet port, a discharge conduit for the cleaned fluid disposed within said chamber and substantially axially of the rotating body of fluid therein, a deflecting edge in the wall of said chamber which is disposed transversely to the line of flow of said fluid and diverts the outer stratum thereof through a port in the chamber wall, and a dust chamber to receive said diverted portion of the fluid.

8. In an apparatus of the character described, a cleaning chamber, means to direct a stream of fluid thereinto so that it circles a number of times therein with a spiral motion about an axis of movement, a dust chamber, said cleaning chamber having an elongated port which extends lengthwise across the path of movement of the circling fluid, a knife-edge deflector to divert the outermost stratum of circling fluid through said port into the dust chamber, and means to return the dust, not deposited in said dust chamber, with said deflected fluid to the circulation in said cleaning chamber so that it is again acted upon therein, and means to draw off the cleaned fluid, substantially as described.

9. In an apparatus of the character described, a chamber circular in cross-section, means to direct a stream of fluid to be cleaned thereinto at a tangent to the circular walls thereof, means to withdraw the cleaned fluid from the center of the mass of moving fluid in said chamber, a dust chamber, a circulation pipe leading from the top of said dust chamber and opening into said cleaning chamber, and two or more deflectors consisting of continuous knife edges which are disposed lengthwise of the casing and act each to deflect an outer stratum of moving fluid with the centrifugally accumulated dust therein from the cleaning chamber into the dust chamber whence it returns through the circulation pipe to the cleaning chamber, substantially as described.

10. In an apparatus of the character described, a circular chamber, means to discharge the fluid to be cleaned thereinto tangentially to give it a spiral vortex movement, means to draw off said fluid at or near its axis of rotation, a deflecting edge which extends the length of the curved wall of said chamber and which deflects the outer stratum of the rotating fluid through a port in the chamber wall, a dust chamber to receive the deflected portion of said fluid, a deflector disposed in said dust chamber which tends to separate from the fluid the impurities therein and deposit same in said latter chamber, and a circulation pipe forming a connection between the said two chambers, substantially as described.

11. An apparatus of the character described comprising a vortex-ring-chamber, means to discharge the fluid to be treated tangentially thereinto, and means to divert the inner and outer strata of the whirling fluid in said chamber, substantially as and for the purposes described.

12. In an apparatus of the character described, an inlet pipe for the fluid to be cleaned, a vortex-ring-chamber into which said pipe discharges said fluid tangentially, an outlet conduit within said chamber for deflecting fluid from the center of the vortex and withdrawing same from said chamber, means to catch and draw off the particles of impurity which are concentrated near the peripheral wall of said chamber due to the centrifugal action of the fluid vortex.

13. In an apparatus of the character described, a vortex-ring-chamber, means to discharge fluid tangentially thereinto to cause same to move in a vortex, means to skim off the outer stratum of the whirling fluid, a deflecting ring positioned in the center of motion of the vortex, and acting to direct the fluid deflected thereby axially of the vortex to a discharge.

14. In an apparatus of the character described, a gas inlet pipe, an annular nozzle which receives gas from said pipe and discharges same in an annular jet, a vortex-ring-chamber into which said jet flows tangentially, a dust chamber which communicates with said vortex-chamber through a port, means within said vortex-chamber at or near the center of motion of the gas which deflects the inner stratum of gas at an angle to its former line of flow and delivers same to a discharge port, and means to provide a restricted circulation from the vortex-chamber to the dust chamber through said port for the purpose of delivering into the latter the dust which is centrifugally expelled toward the wall of said vortex-chamber.

15. In a cleaning apparatus for fluids, means to electrically agglomerate the dust in the gas, means to centrifugally concentrate the agglomerated dust in a portion of the fluid, means to divert said portion of the fluid from the main body, and means to separate the dust from said portion, substantially as described.

16. In a cleaning apparatus for fluids, means to electrically agglomerate the dust in the gas, means to centrifugally concentrate the agglomerated dust in a portion of the fluid, means to divert said portion of the fluid from the main body, means to separate the dust from said portion, and means to return said portion of the fluid after said latter separation process, to the main body of fluid, substantially as described.

17. In a cleaning apparatus for gas, means to electrically agglomerate the dust in suspension in the gas, means to centrifugally concentrate said dust after it has been electrically treated, a deflecting edge to separate from the main body of gas the portion thereof in which said dust is concentrated, and means to separate the dust in said deflected portion.

18. In an apparatus of the character described, the combination of an inlet nozzle, a cleaning chamber into which said nozzle discharges the fluid, to be treated, tangentially, said chamber having a circular wall which receives and guides the inflowing gas causing same to whirl about an axis in the chamber, means to draw off the purified fluid from the center of said chamber, means to deflect from said chamber the particles of foreign matter centrifugally driven to the outer stratum of the whirling fluid, an electrode disposed in said chamber in the path of the fluid, and means to create a discharge of electricity from said electrode into said fluid, as and for the purposes described.

19. In an apparatus of the character described, the combination with a vortex-ring-chamber, of a gas inlet nozzle tangentially disposed to said chamber which has a peripheral out-let port for the dust, means to draw off the purified gas from the center of the vortex, a number of electrodes disposed at different points in the path of the gas as it flows through said apparatus, and means to effect an electrical discharge from said electrodes into the gas, as and for the purposes described.

20. In combination, in a gas cleaner, an inlet port, a spreader to open up the inflowing gas, an annular nozzle through which the gas is discharged in a thin annular jet, a vortex-ring-chamber into which the jet flows tangentially, means to expel the centrifugally concentrated dust from the gas in said chamber, and means to draw off the cleaned gas from said chamber, substantially as described.

21. In an apparatus of the character described, an inlet nozzle, an annular flaring nozzle into which said inlet nozzle discharges, a vortex-ring-chamber into which said annular nozzle discharges tangentially, a dust chamber, a deflector ring which diverts the under stratum of fluid discharged through said annular nozzle into said dust chamber, means to return the fluid and such dust as remains suspended therein from said dust chamber to said annular nozzle through which it flows again past said deflector ring into said vortex-ring-chamber and whirls spirally therein, said chamber having a ring port which opens into said dust chamber, and a deflector near the vortex of the whirling fluid which diverts the inner stratum of said fluid toward a discharge port in said vortex-ring-chamber.

22. In an apparatus of the character described, a vortex-ring-chamber, an annular nozzle disposed concentric with said ring chamber and arranged to discharge the fluid to be treated tangentially thereinto, a fluid inlet pipe, a tapered spreader to receive the inflowing fluid and direct same into said annular nozzle, a circulation nozzle surrounding said inlet pipe and also discharging into said annular nozzle, a ring deflector disposed in front of the discharge orifice of said annular nozzle and acting to divide the stream of inflowing fluid, directing the upper stratum into the vortex-ring-chamber and the lower stratum downwardly, a dust chamber into which said lower stratum is discharged, a second deflector in said vortex chamber which deflects therefrom a further portion of the fluid into said dust chamber, and means to draw off the purified fluid from said cleaning chamber, substantially as described.

23. A gas cleaner comprising a chamber circular in a given cross-section, means to discharge the gas to be cleaned into said chamber at a tangent to its circular cross-section, a dust chamber, a straight edge to deflect the outer stratum as a whole of the gas from said cleaning chamber into the dust chamber, and a circulation conduit for the return of gas from the dust chamber to the cleaning chamber so arranged that the dust particles in the gas not arrested in the dust chamber at the first passage therethrough, are again and again caused to circulate back through the return conduit and to be deflected through the dust chamber until finally arrested in said latter chamber, substantially as described.

24. In a gas cleaning apparatus, a chamber having a circular cross-section, an inlet gas conduit arranged to deliver the gas into said chamber tangentially in the plane of its circular cross-section, a dust chamber, a return flue leading from the dust chamber to said inlet conduit, and a straight edge deflector in the cleaning chamber to deflect the entire outer stratum of gas in which the dust is centrifugally concentrated into said dust chamber, substantially as described.

25. In a cleaning apparatus for gas, a cleaning chamber, a gas inlet pipe to discharge the gas to be cleaned into said chamber, a dust chamber, means to divert from the cleaning chamber a portion of the gas into said dust chamber, a pipe leading from said dust chamber and opening into the said inlet pipe at a point where the inflow of gas into the chamber from said supply pipe will act with a suction effect to maintain a circulation of gas through the dust chamber back into the cleaning chamber.

26. In a gas cleaning apparatus, a cleaning chamber circular in cross-section, a gas inlet pipe having a long downwardly extending narrow nozzle for the discharge of the gas into said chamber tangentially, a dust chamber, a knife-edge deflector positioned in front of said nozzle and adapted to deflect the lower portion of the gas jet into the dust chamber, and a downwardly opening pipe leading from the top of the dust chamber and opening into said nozzle, substantially as described.

27. In a gas cleaning apparatus, a cleaning chamber circular in cross-section, a gas inlet pipe having a long narrow nozzle for the discharge of the gas into said chamber tangentially, a dust chamber, a knife-edge deflector positioned in front of said nozzle and adapted to deflect the outer stratum of the gas jet into the dust chamber, a downwardly opening pipe leading from the top of the dust chamber and opening into said nozzle, and a second knife-edge deflector positioned behind said first deflector in the direction of the flow of the gases and acting to deflect into said dust chamber the stratum of gas next to said first deflected stratum, substantially as described.

28. A gas cleaner having a vortex-ring chamber, an annular nozzle to discharge gas tangentially into said ring chamber, a dust chamber below said ring chamber, a gas supply pipe for said nozzle, a circulation pipe having its open top disposed centrally and near the top wall of said dust chamber and opening into said nozzle, means to deflect portions of the gas discharged by said nozzle from the cleaning chamber into the dust chamber, and baffle means in the dust chamber to separate the dust from the gas directing the former into the dust chamber and the latter into said circulation pipe, substantially as described.

29. In a gas cleaner, a cleaning chamber having a circular cross-section, means to discharge gas into said chamber tangentially to its circular section, a dust chamber, deflector means to divert a layer of gas in which the dust is centrifugally concentrated from said cleaning chamber, means in said dust chamber to centrifugally concentrate the dust in the deflected gas, means in said dust chamber to separate a cleaner portion of said deflected gas from the portion thereof in which the dust is centrifugally concentrated, a circulation pipe leading from said dust chamber to said cleaning chamber, and baffles in said dust chamber to direct the cleaner portion of the diverted gas directly to the inlet end of said pipe and cause the dirtier portion of the gas to flow in a more circuitous route to said inlet end, as and for the purposes described.

30. In a gas cleaner, the combination with a cleaning chamber, a supply pipe for the cleaning chamber, a dust chamber, a pipe leading from the top of the dust chamber to return the gas into the circulation in the cleaning chamber, one or more deflectors to divert an outer stratum of gas from the cleaning chamber, centrifugal means acting on said diverted stratum to concentrate the dust therein, and further deflectors to divert the cleaner portion of said stratum toward the open end of said return pipe, substantially as described.

In testimony whereof I have hereunto set my hand in presence of two subscribing witnesses.

MARK W. JOHNSON, Jr.

Witnesses:
R. D. JOHNSTON, Jr.,
ANNIE L. PEACE.